(No Model.) 2 Sheets—Sheet 2.
W. GRUNOW, Jr.
TROLLEY WHEEL FRAME FOR TROLLEY CARS.
No. 579,576. Patented Mar. 30, 1897.
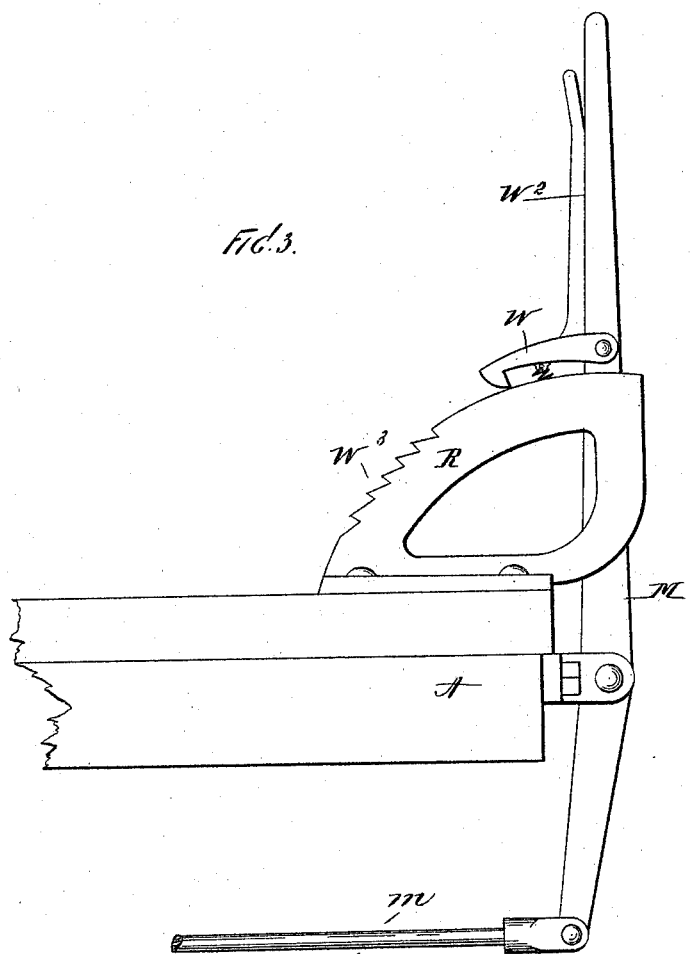
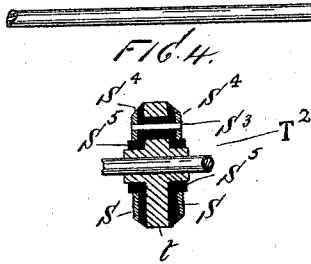
WITNESSES
INVENTOR
William Grunow, Jr.,
BY
Edgar Tate & Co
ATTORNEYS

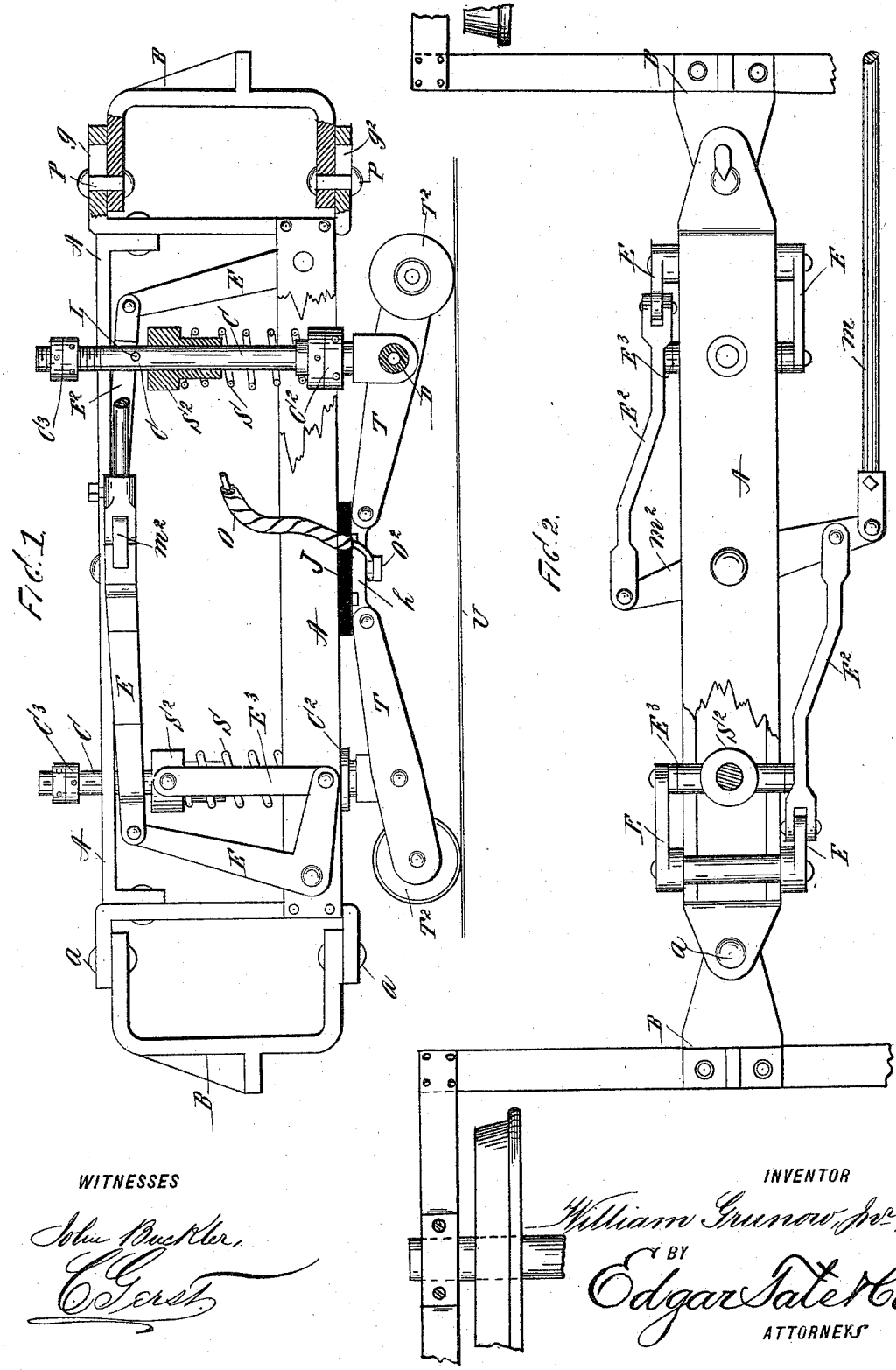

United States Patent Office.

WILLIAM GRUNOW, JR., OF BRIDGEPORT, CONNECTICUT, ASSIGNOR OF ONE-HALF TO ZALMON GOODSELL, OF SAME PLACE.

TROLLEY-WHEEL FRAME FOR TROLLEY-CARS.

SPECIFICATION forming part of Letters Patent No. 579,576, dated March 30, 1897.

Application filed May 8, 1896. Serial No. 590,788. (No model.)

*To all whom it may concern:*

Be it known that I, WILLIAM GRUNOW, Jr., a citizen of the United States, and a resident of Bridgeport, in the county of Fairfield and State of Connecticut, have invented certain new and useful Improvements in Trolley-Wheel Frames for Trolley-Cars, of which the following is a specification, reference being had to the accompanying drawings, forming a part thereof, in which similar letters of reference indicate corresponding parts.

This invention relates to tangential contact-wheel frames for trolley-cars; and the object thereof is to provide an improved device of this class which is intended for cars having separate swiveling-trucks, to which it is adapted to be secured, as hereinafter described, whereby the trolley or contact wheels may be kept on a depressible rail, whether the latter be straight or curved, so that when the car and its trucks are on a straight track all the parts are in alinement and parallel, but when entering on a curve or when fully on the same the trucks may take a radial position to one another and the apparatus operate as fully and completely as though the trucks were on a straight line.

My invention is particularly applicable to electrical and trolley cars and railways in which depressible rails are employed beneath the car and in the center of the track, with which contact is made by the trolley-wheels, such, for instance, as are referred to in an application for Letters Patent of the United States filed by me October 28, 1895, Serial No. 567,139, and also in another application for Letters Patent of the United States filed by me August 27, 1895, Serial No. 560,662, and said invention is fully disclosed in the following specification, of which the accompanying drawings form a part, in which—

Figure 1 is a side view of my improvement, parts thereof being shown in section; Fig. 2, a plan view thereof with a part of the construction broken away so as to better show the same; Fig. 3, a side view of a portion of the frame and showing an operating-lever connected therewith, and Fig. 4 a section of one of the trolley-wheels which I employ.

By proportioning the distance between the truck center a frame can be mounted and pivotally held at its ends to its respective truck in such manner that it will always be held and guided in a line tangential to a curve, thus keeping the trolley or contact wheels on the depressible rail, and in the practice of my invention I provide two brackets B, each of which is bolted to its respective truck-frame, and a frame A is pivotally attached at one end to one of the brackets B, as shown at $a$, while the other end of said frame is secured to or connected with the other bracket B in such manner as to allow for the vibrations of the trucks which are caused when the trucks pass from a straight to a curved track or from a curved track to a straight track, and for this purpose said end of the frame is provided with slots $g$ and $g^2$ and is guided by pivot-pins P, which are passed through or secured to the upper and lower sides of the bracket.

To the lower side of the frame A is secured an insulating-block J, to which is bolted or otherwise secured a hinged block $h$, to which at its opposite ends forked arms or levers T are pivotally attached. The arms or levers T carry at their free ends trolley or contact wheels $T^2$, having shield-plates $S^4$ on their opposite sides, as shown in Fig. 4, and from which they are insulated by some suitable insulating material $S^5$, and the bolts $S^3$, which hold the opposite protecting or shield plates S in position, are insulated by suitable tubular bushings from the trolley or contact wheel where they pass through the same.

To the fork arms or levers T, and between the contact-wheel and the pivot-pins by which said arms or levers are connected with the hinge-block $h$, are pivotally connected spring-operated rods C, which extend upwardly from said arms or levers through the frame A, and the spring-operated rods C are thoroughly insulated from the forked arms or levers T, as shown, by the insulating-bushing D or in any desired manner.

The rods C are each threaded at their lower ends and supplied with nuts $C^2$, which are designed for the purpose of adjusting the tension of the springs S, one of which is mounted on each of said rods and which press downwardly against said nuts at their lower ends, while their upper ends press against trunnioned sleeves $S^2$, one of which is mounted on each of said rods C and free to slide thereon, and said springs force said sleeves $S^2$ upwardly against stop-pins L, one of which is connected with or passed through each of the rods C, and these rods pass through the upper part of the frame A and are provided at their upper ends with nuts $C^2$, which are designed to provide means for adjusting the downward movement of the trolley arms or levers T.

A lever M is pivotally connected with the upper part of the frame A and is connected at its lower end with a rod $m$, which is connected with a cross-lever $m^2$, which is pivotally connected with any desirable part of the car, and this lever M is provided with a pawl W, with which is connected a release handle or lever $W^2$, whereby the lever M can be held in position by the pawl, which engages with suitable teeth $W^3$, formed on a segmentally-curved rack-bar R.

Pivotally connected with the lower part of the frame A are crank-levers E, which are connected by rods $E^2$ with the lever $m^2$, with which the rod $m$ is also connected, said rods $E^2$ being connected with the lever $m^2$ at its opposite ends, and the other ends of said rods are also connected by means of rods or bars $E^3$ with their respective trunnion-sleeves $S^2$, and a conductor-cable O leads from the motor and is connected with the hinge-block H by means of a screw or clamp $O^2$.

The operation will be readily understood from the foregoing description when taken in connection with the accompanying drawings and the following statement thereof.

By operating the lever M the trolley arms or levers T and their respective wheels are simultaneously raised from or lowered to the depressible rail U, and by exerting a pull on the lever the rail will be forced downwardly by the increase of the tension of the springs S, which will fully exert their pressure through the trolley-wheels on the rail U, as will be readily understood, and as the tension of the springs becomes lessened by reason of the sleeves $S^2$ being first forced upwardly against the stop-pins L the rods C will be lifted upwardly and will thus raise the trolley-wheels with them.

This device is simple in construction and operation and will be thoroughly understood by all those familiar with this class of devices, and it is evident that changes in and modifications of the construction herein described may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

1. A tangential trolley-wheel frame, which is connected with the trucks of a car as herein described, one end being pivotally connected therewith, and adapted to swing, and the other end being also pivotally connected therewith, and provided with means whereby a slight sliding motion may be secured, said frame being also provided with trolley arms or levers pivotally connected with the bottom thereof, each of which is provided with a trolley-wheel, and with a vertical rod which passes through said frame, on each of which are mounted spring-regulating nuts, each rod being also provided with a strong spiral spring, which bears upon said nuts, and with a vertically-movable sleeve, which rests upon said springs and means for operating said devices, substantially as shown and described.

2. A tangential trolley-wheel frame, which is connected with the trucks of a car as herein described, one end being pivotally connected therewith, and adapted to swing, and the other end being also pivotally connected therewith, and provided with means whereby a slight sliding motion may be secured, said frame being also provided with trolley arms or levers pivotally connected with the bottom thereof, each of which is provided with a trolley-wheel, and with a vertical rod which passes through said frame, on each of which are mounted spring-regulating nuts, each rod being also provided with a strong spiral spring, which bears upon said nuts, and with a vertically-movable sleeve, which rests upon said springs, and means for operating said devices, consisting of crank-levers pivotally connected with the frame and provided with rods which are connected with said sleeves, said crank-levers being also connected with a suitably-supported cross-lever, which is connected with an operating-lever, substantially as shown and described.

3. A tangential trolley-wheel frame, which is connected with the trucks of a car as herein described, one end being pivotally connected therewith, and adapted to swing, and the other end being also pivotally connected therewith, and provided with means whereby a slight sliding motion may be secured, said frame being also provided with trolley-arms or levers pivotally connected with the bottom thereof, each of which is provided with a trolley-wheel, and with a vertical rod which passes through said frame, on each of which are mounted spring-regulating nuts, each rod being also provided with a strong spiral spring, which bears upon said nuts, and with a vertically-movable sleeve, which rests upon said springs, and means for operating said devices, consisting of crank-levers pivotally connected with the frame, and provided with rods which are connected with said sleeves, said crank-levers being also connected with a suitably-supported cross-lever, which is connected with an operating-lever, said operating-lever being provided with a pawl which operates in connection with a curved rack-bar, and which is provided with a rod or lever by which it is operated, substantially as shown and described.

4. The combination with a car, provided with separate swinging trucks, of a tangential trolley-wheel frame, the ends of which are pivotally connected with said trucks, and one end of which is adapted to move laterally thereon, said frame being provided at its lower side with two pivoted arms or levers which project in opposite directions, each of which is provided with a trolley-wheel adapted to bear upon a depressible rail, and means connected with said arms or levers for raising or lowering the same, substantially as shown and described.

5. The combination with a car, provided with separate swinging trucks, of a tangential trolley-wheel frame, the ends of which are pivotally connected with said trucks, and one end of which is adapted to move laterally thereon, said frame being provided at its lower side with two pivoted arms or levers which project in opposite directions, each of which is provided with a trolley-wheel adapted to bear on a depressible rail, and means connected with said arms or levers for raising or lowering the same, consisting of crank-levers connected with said frame, and connected by means of rods with sliding sleeves mounted on vertical rods which are supported by said arms or levers, said vertical rods being provided with springs which are mounted thereon, and which support said sleeves, and said crank-levers being also connected with a suitably-supported cross-lever, and said cross-lever being connected with an operating-lever, substantially as shown and described.

6. The combination with a car, provided with separate swinging trucks, of a tangential trolley-wheel frame, the ends of which are pivotally connected with said trucks, and one end of which is adapted to move laterally thereon, said frame being provided at its lower side with two pivoted arms or levers which project in opposite directions, each of which is provided with a trolley-wheel adapted to bear on a depressible rail, and means connected with said arms or levers for raising or lowering the same, consisting of crank-levers connected with said frame, and connected by means of rods with sliding sleeves mounted on vertical rods which are supported by said arms or levers, said vertical rods being provided with springs which are mounted thereon, and which support said sleeves, and said crank-lever being also connected with a suitably-supported cross-lever, said cross-lever being connected with an operating-lever, which is provided with a pawl which is adapted to operate in connection with a curved rack-bar, substantially as shown and described.

7. The combination with a car, provided with separate swinging trucks, of a tangential trolley-wheel frame, the ends of which are pivotally connected with said trucks, and one end of which is adapted to move laterally thereon, said frame being provided at its lower side with two pivoted arms or levers which project in opposite directions, each of which is provided with a trolley-wheel adapted to bear on a depressible rail, and means connected with said arms or levers for raising or lowering the same, consisting of crank-levers connected with said frame, and connected by means of rods with sliding sleeves mounted on vertical rods which are supported by said arms or levers, said vertical rods being provided with springs which are mounted thereon, and which support said sleeves, and said crank-levers being also connected with a suitably-supported cross-lever, said cross-lever being connected with an operating-lever, which is provided with a pawl which is adapted to operate in connection with a curved rack-bar, and said vertical rods which are connected with said trolley arms or levers being also provided with set-nuts by which the pressure of the springs is regulated, substantially as shown and described.

8. A tangential trolley-wheel frame, which is adapted to be connected with the trucks of a car as herein described, and which is provided with trolley arms or levers pivotally connected therewith, each of which is in operative connection with a transverse lever, and said transverse lever being in operative connection at one end thereof with a main operative lever, substantially as shown and described.

9. A tangential trolley-wheel frame, which is adapted to be connected with the trucks of a car as herein described, and which is provided with trolley arms or levers pivotally connected therewith, each of which is in operative connection with a transverse lever, and said transverse lever being in operative connection with a main operative lever, said trolley arms or levers being also provided each with a vertically-movable rod, on each of which is mounted a sliding sleeve which is spring-operated, and each of which is connected with a crank-lever, which is in operative connection with a suitably-supported cross-lever, and means for operating said cross-lever, substantially as shown and described.

10. The combination with a tangential trolley-wheel frame of the character described, and which is provided with trolley arms or levers pivotally connected therewith, each of which is in operative connection with a transverse lever, said transverse lever being connected with an operative lever, said trolley arm or lever being also provided with a vertically-movable rod, on each of which is mounted a spring-actuating lever and each of which is connected with a crank-lever which is in operative connection with a suitably-supported cross-lever, and means for operating said levers, of the trolley-wheels carried by said trolley-arms and provided with shields or plates on the opposite sides thereof which are insulated from the wheel, said wheels being held in position by bolts passing through insulated bushings in the wheels, substantially as shown and described.

In testimony that I claim the foregoing as my invention I have signed my name, in presence of the subscribing witnesses, this 2d day of May, 1896.

WILLIAM GRUNOW, JR.

Witnesses:
H. F. NORCROSS,
CHARLES KELSEY.